United States Patent [19]

Kato et al.

[11] 4,004,369
[45] Jan. 25, 1977

[54] WATER CULTIVATION METHOD

[75] Inventors: Hisayoshi Kato, Nagoya; Ryuhji Ueno, Kasugai, both of Japan

[73] Assignee: Nihon Jescoal Industry Co., Ltd., Japan

[22] Filed: Dec. 30, 1974

[21] Appl. No.: 537,424

[52] U.S. Cl. .................................. 47/62; 71/11; 71/79; 47/1.4

[51] Int. Cl.$^2$ ........................................ A01G 31/00

[58] Field of Search ............... 47/1.1, 1.2, 1.4, 14, 47/16; 119/5; 210/169; 71/79, 11, 19, 23–24

[56] References Cited

UNITED STATES PATENTS

| | | | |
|---|---|---|---|
| 2,782,161 | 2/1957 | Willinger et al. | 119/5 UX |
| 2,928,211 | 3/1960 | Martin | 47/1.2 |
| 3,131,064 | 4/1964 | Malchair | 47/1.2 |
| 3,135,238 | 6/1964 | Eyl | 119/5 |
| 3,511,376 | 5/1970 | Sesholtz | 119/5 X |
| 3,785,342 | 1/1974 | Rogers | 119/5 |
| 3,785,493 | 1/1974 | Harding | 119/5 X |
| 3,828,470 | 8/1974 | Stoller | 47/1.1 |

OTHER PUBLICATIONS

Hydroponics, Douglas, Oxford Univ. Press, 1959, p. 71 cited of interest.

*Primary Examiner*—Robert E. Bagwill
*Attorney, Agent, or Firm*—Robert E. Burns; Emmanuel J. Lobato; Bruce L. Adams

[57] ABSTRACT

Water containing nutrients is added to powdered activated carbon or passed through a layer of granular activated carbon for clarification, and water cultivation is effected in facilities by supplying the nourishing water in a water cultivation vessel, inserting seedlings of vegetables to a water cultivation panel installed above the vessel, and, if necessary, providing atmospheric conditions, water temperature and water quality suitable for the growth of the seedlings.

5 Claims, 10 Drawing Figures

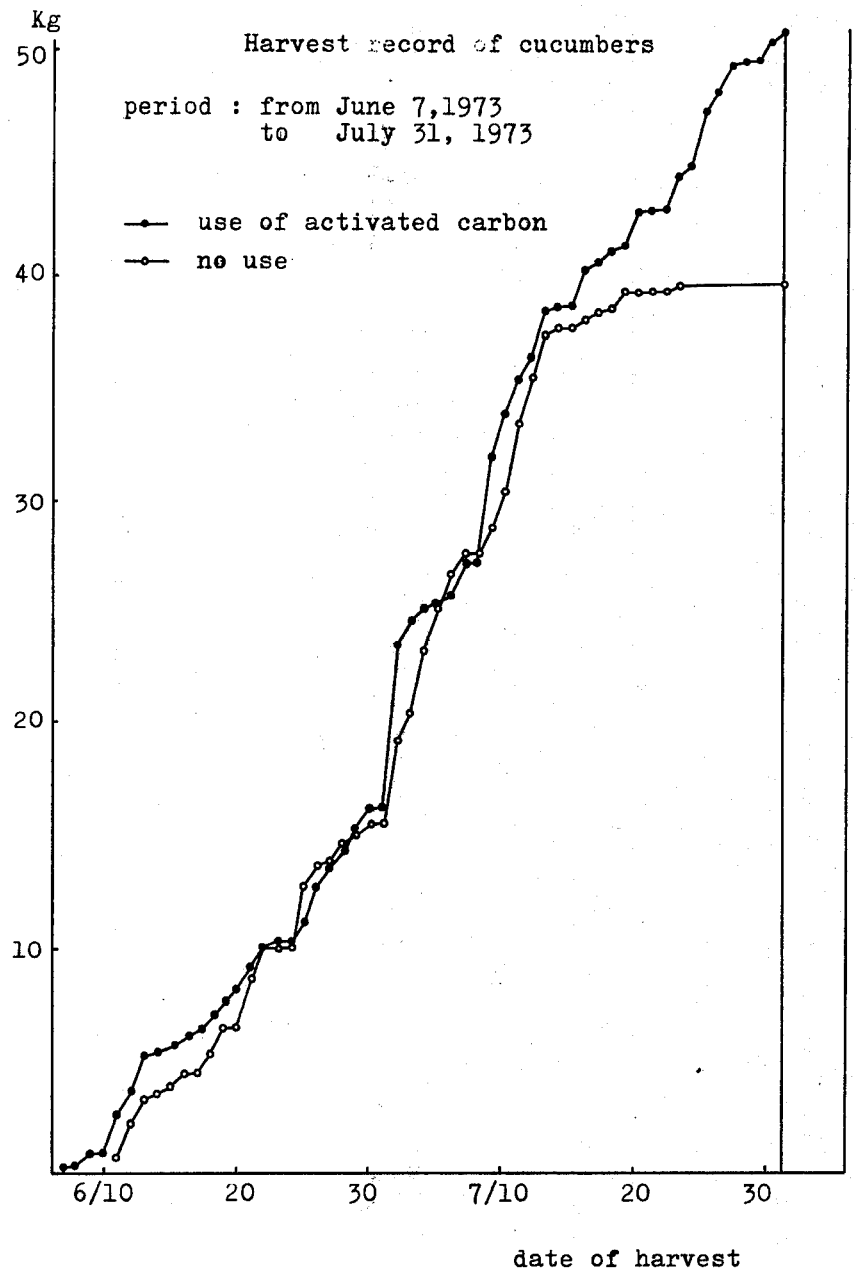

WATER CULTIVATION METHOD

BACKGROUND OF THE INVENTION

Growth of vegetables is effected by absorbing nutrients comprising six principal elements, i.e., nitrogen, phosphoric acid, potassium, calcium, magnesium, sulfur and a small quantity of iron, manganese etc. from the root, wherein such nourishment is absorbed in the form of ionized inorganic materials.

In soil cultivation, a fertilizer including much organic materials such as an oil cake, as compost is applied, wherein such fertilizer can not be absorbed as the nutrients until the fertilizer is dissolved by bacteria etc. in the soil and converted into inorganic material little by little.

In view of this point a, water cultivation is a reasonable method in which a suitable amount of synthetic inorganic chemical fertilizer is introduced in the water. Water cultivation has many other advantages hereinafter described, particularly for vegetables unsuitable for consecutive planting. Vegetables which grow very poorly when planted consecutively can not be cultivated if the soil is not changed each time of cultivation or the cultivation position is not changed, while water cultivation can be performed repeatedly in the same position by changing the water in the vessel without troublesome work, such as position changing or soil changing.

There are many causes of vegetables being unsuitable for consecutive planting. The most important factor among these is a self-poisoning phenomenon caused by an organic secretion of the vegetable itself and putrefaction of the remaining root etc. That is to say, existence of the organic substance is harmful to the growth of the vegetable. In case of soil cultivation, the consecutive cultivation can not be performed until the organic substance is dissolved and disappears.

The water cultivation method is epoch-making as a new agricultural method and is expected to develop in the future. The principal features of the water cultivation method are as follows:

1. Minimizing of power and mechanization can be effected. That is to say, labor with a hoe, a spade and the like is not necessary, furthermore labor for weeding and the like is not necessary. Such labor is replaced by a computational control such as water quality control or environment control which is light work.

2. In order to eliminate hindrances of consecutive planting, change of soil or change of farming location is not necessary, and cultivation can be effected at the same location repeatedly by changing the water only. While improvement of breeding or grafting has been performed in order to eliminate obstruction according to consecutive planting up to now, the environment becomes changeable so as to be optimum for vegetables.

3. Since fertilizer is dissolved and circulated in the water, loss of the fertilizer does not result from flowing and the necessary nourishment can be applied effectively in the required amount.

4. Stable cultivation can be performed substantially without being influenced by weather conditions.

5. Automation by means of computational control is possible and each vegetable can be cultivated at optimum conditions, therefore both quality and production amount are stabilized throughout the year.

6. The root portion, the most important part of the vegetable is satisfied with the necessary conditions of water, air, nourishing liquid (hereinafter nourishing water) and is separated from natural environment, therefore damage by blight and insects is scarcely produced, so as to permit clarified cultivation.

7. On account of controlled cultivation, planting is highly developed and intensive; therefore the harvest amount per unit area can be increased several times greater than that attainable using soil cultivation.

On the other hand, conventional water cultivation has the following defects:

1. Since the water is circulated for the cultivation, if disease germs are introduced in the water, the germs spread throughout and the damage is large.

2. The most important point of water cultivation is in the quality of the nourishing water, therefore water cultivation in a region of bad water quality is difficult.

3. Even in the case of good water quality, the water is contaminated at the end step of harvest causing it to be diseased.

4. When remaining roots and leaves are rotted in the water cultivation vessel, elevation of BOD (Biochemical Oxygen Demand) obstructs growth of vegetables.

Although water cultivation has the above described defects, in the conventional water cultivation method the organic substance dissolved in the nourishing water can not be effectively eliminated, therefore the water quality can not be held at optimum condition. Moreover, for specific vegetables, such as horseradishes, which can grow up only in restricted natural environment, the water cultivation can not be carried out on a business scale, because the water quality of the nourishing water can not be held in suitable condition for growing horseradishes.

The inventors have noticed that activated carbon adsorbs an organic substance quite easily but does not adsorb an ionized inorganic substance, and the present invention can eliminate the above four defects which obstruct the development of the water cultivation method. That is to say, we have noticed that the property of activated carbon of adsorbing organic substance dissolved in the nourishing water corresponds to elimination of BOD (Biochemical Oxygen Demand) and COD (Chemical Oxygen Demand) in the water utilizing the activated carbon for processing the waste water.

The principal object of the present invention is to provide an improved method of water cultivation by using an activated carbon as a nourishing water clarifying medium so as to hold the water quality constant, wherein growth promotion and harvest increase of vegetables are effected to a degree which can not be expected in conventional water cultivation method moreover, water cultivation can be applied to usual vegetables as well as specific vegetables such as horseradishes which grow up only under specific environmental conditions.

BRIEF DESCRIPTION OF THE DRAWINGS

FIG. 4 is a view showing a comparison of roots of cucumbers in using an activated carbon and no-use during the same period, wherein FIG. 4A shows no-use state and FIG. 4B shows using activated carbon;

FIG. 5 is a view showing a comparison of roots of marsh parsleys during the same period, wherein FIG. 5A shows no-use state and FIG. 5B shows using activated carbon;

FIG. 6 is a diagram illustrating a harvest record of cucumbers; and

DESCRIPTION OF THE PREFERRED EMBODIMENT

Figure 1:
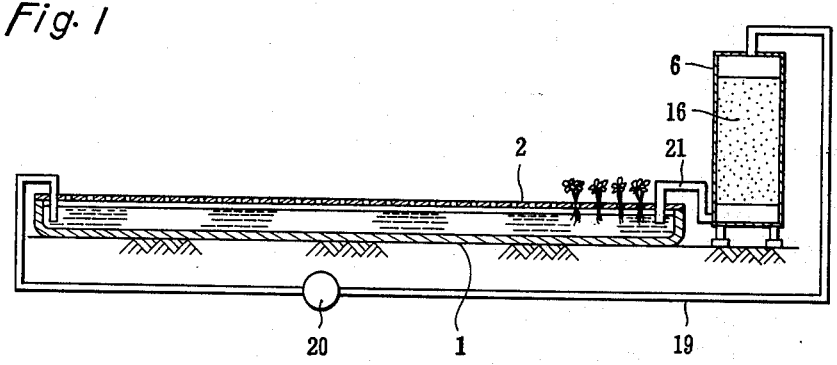
FIG. 1 is a view of an apparatus as an embodiment of the present invention method.

An embodiment of the method according to the present invention will be explained hereinafter.

The water cultivation method according to the present invention shall be classified into two principal methods. One is the method wherein powdered activated carbon is introduced in the nourishing water, so that the fertilizer component is not adsorbed but any organic substance which is harmful to vegetables is adsorbed and eliminated by the activated carbon, with good results for the vegetables.

While in another method of the invention, nourishing water is filtered by means of a granular activated carbon layer and the clarified nourishing water effects the water cultivation.

Whichever method is adopted, the activated carbon adsorbs not only organic substances harmful to vegetables, but also bacteria and disease germs, so that the water is held in a clean state; thereby vegetables are protected from disease and the growth of roots is much improved, resulting in the promotion of growth, increase of harvest amount in comparison to no-use of activated carbon, improvement of the lively state of vegetables, and an increase of resistance against germs.

Particularly, in a vegetable such as a melon, a watermelon, a tomato or a cucumber, which is sensitive to water quality and unsuitable for consecutive planting, the clarification of nourishing water produces a profitable effect and the advantage of the water cultivation is further effectively revealed according to the use of the activated carbon. Moreover, since the water is held in a clear state even at a later step of the harvest according to the use of the activated carbon, the period of harvest can be elongated in comparison to prior art water cultivation methods and the harvest amount is increased also due to this effect.

In the first method in which powdered activated carbon is added directly to nourishing water, the addition of activated carbon at a rate of 0.1–0.2% to the nourishing water can produce sufficient results; therefore adding of a small amount of the activated carbon permits the use of water cultivation even in the case of water unsuitable for the water cultivation method.

The method in which the activated carbon is added directly to nourishing water is unsuitable in the case wherein the activated carbon which adsorbs and holds bacteria must be removed or in the case wherein the vessel for the water cultivation should not be blackened by the activated carbon. Therefore, in such cases the nourishing water filtering method is preferable wherein a column filled with granular activated carbon is provided separately, and the nourishing water is passed through the column and circulated.

1. Water cultivation method utilizing powdered activated carbon.

EXAMPLE 1

Cultivation experiment of marsh parsleys.

The conditions of cultivation of marsh parsley in a water solution containing nourishment and activated carbon in accordance with the invention and comparison cultivation under substantially the same conditions except for the absence of activated carbon are shown in Table 1.

Figure 5:
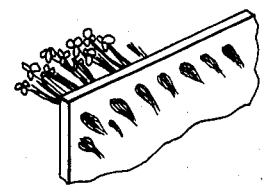
Figure 5:
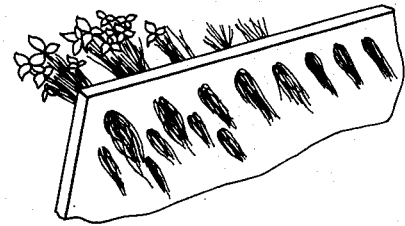

As the result of comparison of cultivation wherein 0.2% by weight of powdered activated carbon is added to the nourishing water and the cultivation without adding carbon at an intermediate state of the growth, a visible difference in the growth of the root is evident wherein cultivation is carried out in the presence of added activated carbon, as illustrated in FIG. 5. In fact, the mean length of the root portion after only 1 week of growth is 12 cm. when activated carbon is added to the nourishing water and 8 cm. in length when no activated carbon is used.

The experimental results are shown in Table 1. In the case of using activated carbon, the harvest amount increases by 13.1% and the quality of vegetable is soft and good.

Table 1

| Item | | Using activated carbon | no use of activated carbon |
|---|---|---|---|
| Cultivation period * (from planting to the end) | | 50 days | 50 days |
| Number of vegetables planted | | 640 | 644 |
| Harvest amount | Weight of harvest | 44.1 kg | 39.0 kg |
|  | Number of pieces | 640 | 644 |
|  | Mean weight per piece | 68.9 g | 60.5 g |
| Cultivation condition | Volume of water in the panel | 500 l | 500 l |
|  | PH | 5.0 | 5.0 |
|  | Water quality (underground water) | 30μυ/cm | 30μυ/cm |
|  | Water temperature | 19 –23° C | 19 – 23° C |
|  | activated carbon | 0.2% (1 kg) to nourishing water | none |
| amount of fertilizer used | standard combined fertilizer for water cultivation | 3.87 kg | 3.87 kg |
|  | H₂SO₄ | 4 ml | 4 ml |
|  | CaCO₃ | 40 g | 50 g |

Table 1-continued

| Item | | Using activated carbon | no use of activated carbon |
|---|---|---|---|
| Increase rate | increased harvest amount | 13.1% | — |
| | weight increase per piece | 8.4 g, 13.9% | — |
| remarks : | experiment period, from February 22, 1973 to April 13, 1973(50 days) temperature ° C – ° C | | |

* cultivation period

| | | from dipping |
|---|---|---|
| dipping | January 18 | |
| sowing | January 26 | 8 days |
| germination | January 30 | 12 |
| seed leaf | February 15 | 28 |
| planting | February 22 | 35 |
| harvest | April 13 | 85 |
| | from planting | 50 days |

EXAMPLE 2

Cultivation experiment of cucumbers.

Figure 4:
Figure 4:
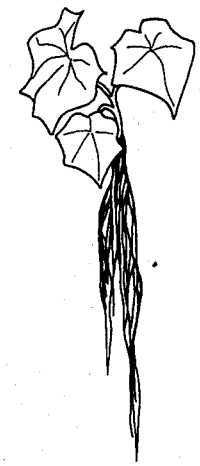

As shown by comparison of the growth of roots, stalks and leaves during the growing process in the case of adding 0.2% granular activated carbon to the nourishing water illustrated in FIG. 4B and in the other case of not adding carbon illustrated in FIG. 4A, adding of the activated carbon produces remarkably good results in relation to not-adding.

The experimental results are shown in Table 2. In the case of using activated carbon, the harvest amount (in weight) increases by 28% and 18% in the number of pieces. Even at the end step of harvest, the liveliness of the vegetables cultivated by the nourishing water using activated carbon does not diminish and the branches are spread successively; therefore the harvest period can be lengthened.

Further, in another cultivation experiment the harvest can be effected continuously for eight months by means of the use of the activated carbon.

Table 2

| Item | | using activated carbon | no use of activated carbon |
|---|---|---|---|
| Cultivation period (from planting to the end) | | 102 days | 102 days |
| number of vegetables planted | | 23 | 25 |
| Harvest amount | Weight of harvest | 50.6 kg | 39.5 kg |
| | Number of trunks | 368 | 311 |
| | Weight of harvest per one trunk | 2 kg per one trunk | 1.5 kg per one trunk |
| | Number of pieces per one trunk | 14.7 pieces per one trunk | 12.4 pieces per one trunk |
| | Mean weight per piece | 137.6 g | 127.2 g |
| Cultivation condition | Volume of water in the panel | 500 l | 500 l |
| | PH | 5.5 | 5.5 |
| | Water quality (underground water) | 30μv/cm. | 30μv/cm |
| | Water temperature | 20 – 23° C | 20 – 23° C |
| | activated carbon | 0.2%(1 kg)to nourishing water (divided at two times) | none |
| amount of fertilizer used | standard combined fertilizer for water cultivation | 11.4 kg | 10.2 kg |
| | $H_2SO_4$ | none | none |
| | $CaCO_3$ | 25 g | 50 g |
| Increase rate | increased harvest amount | 28% | — |
| | increase in number of pieces | 18.3% | — | experiment period : from April 20, 1973 to July 31, 1973 (for 102 days)

EXAMPLE 3

Cultivation experiment of musk-melon.

Granular activated carbon in an amount of 0.4% is supplied separately at two times in the nourishing water.

Figure 7A:
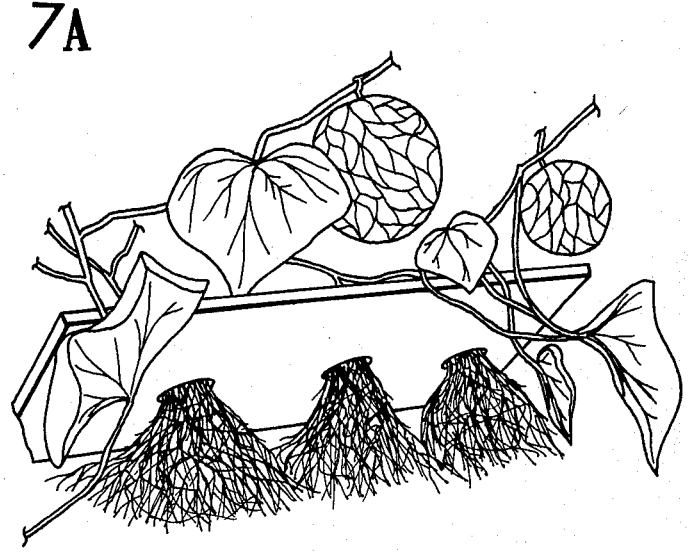
FIG. 7A and FIG. 7B show a comparison of the roots of musk melon, wherein activated carbon has been used in the water in which the roots illustrated in FIG. 7A were grown and no activated carbon has been used in the water in which the roots illustrated in 7B were grown.
Figure 7B:
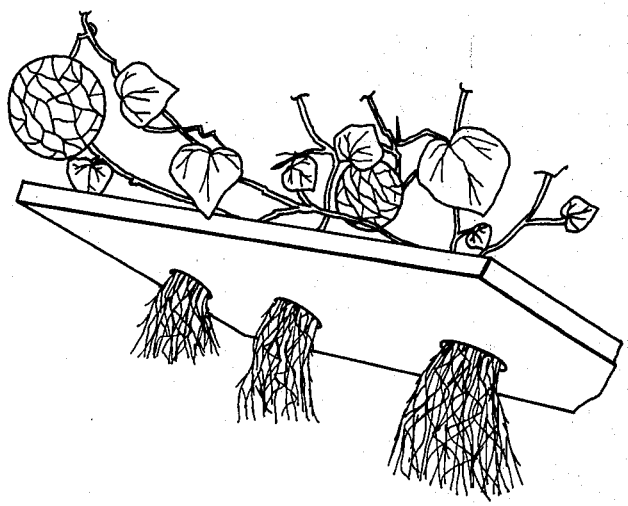

In the case of utilizing the activated carbon, growth of roots is good and also liveliness is good as shown in FIG. 7A, whereas the growth and liveliness of musk-melon grown in nourishing water which has not been treated with activated carbon are relatively poor, as shown in FIG. 7B.

Similarly to Example 1 and 2, in the case of using the activated carbon the harvest amount increases by 34% and the quality is good. The result is shown in Table 3.

Table 3

| Item | | using activated carbon | no use of activated carbon |
|---|---|---|---|
| cultivation period * (from planting to the end) | | 81 days | 81 days |
| number of vegetables planted | | 53(including 2 each having 2 fruits) | 54 |
| vegetables pulled away on account of insufficient growth etc. | | 15 | 18 |
| Harvest amount | weight of harvest | 32.7 kg | 24.4 kg |
| | number of pieces | 40 | 36 |
| | mean weight per piece ** | 817 g | 678 g |
| | number of pieces in each class | (A class) 31 | 20 |
| | | (B class) 7 | 10 |
| | | (C class) 2 | 6 |
| cultivation condition | volume of water in the panel | 500 l | 500 l |
| | PH | 5.5 | 5.5 |
| | water quality (underground water) | 30 μυ/cm | 30 μυ/cm |
| | water temperature | 23 – 27° C | 23 – 27° C |
| | activated carbon | 0.2(1 kg) to nourishing water × 2 times | none |
| amount of fertilizer used | standard combined fertilizer for water cultivation | 15.5 kg | 15.5 kg |
| | H₂SO₄ | none | none |
| | CaCO₃ | 260 g | 280 g |
| Increase rate | increased harvest amount | 34.0% | — |
| | weight increase per piece | 39 g , 20.5% | — | experiment period: from August 1, 1973 to October 20, 1973 (for 81 days)

* cultivation period

| | | from dipping |
|---|---|---|
| dipping | July 14 | g days |
| sowing | July 23 | 9 days |
| planting | August 1 | 17 |
| cross fertilization | August 27 | 44 |
| harvest | October 20 | 98 |
| | from planting | 81 days |

** This classification is based on size, shape and uniformity in surface Figure.

EXAMPLE 4

Cultivation experiment of tomato seedlings.

Sand is put in seed beds, to one of which powdered activated carbon is added in an amount of 0.1% by weight in relation to the sand. As shown in FIG. 7, in the case of adding the activated carbon (A) the mean length of roots is about 7 cm, while in the case of not adding (B) the mean length is about 4 cm. The growth in (A) is remarkably better than that in (B).

2. Activated carbon filtering method.

This is the method wherein granular activated carbon is filled in the column and the nourishing water is passed through the activated carbon layer so as to eliminate harmful organic material. Practically speaking the two means for carrying out this embodiment of the invention are: (A) using nourishing water which has been previously clarified by passing the water through an activated carbon layer and (B) connecting the water cultivation vessel and the activated carbon column with pipes, so that the nourishing water is steadily circulated and clarified. FIG. 1 shows an apparatus as an embodiment wherein 1 designates a water cultivation vessel, 2 designates a water cultivation panel, one end of a circulation pipe 19 is connected to the water cultivation vessel 1 and the other end is connected to upper portion of a column 6 provided with an activated carbon layer 16. A pump 20 is installed in an intermediate portion of the circulation pipe 19. A pipe 21 connects the water cultivation vessel 1 with bottom of the column 6 so as to supply the clarified nourishing water to the water cultivation vessel 1.

EXAMPLE 5

Utilization in water cultivation farm unsuitable for growth of vegetables.

In a water cultivation farm for cucumbers and tomatoes, insufficient growth occurred due to bad water quality; however, the growth was remarkably improved by installing the granular activated carbon column and using the treated water for cultivation.

EXAMPLE 6

Utilization in water cultivation farm for vegetables having illness in root portion.

A vessel containing nourishing water is connected with an activated carbon column and water is circulated thereby the growth of vegetables is remarkably improved.

Since the column method is an endless multi-stage adsorption method, the activated carbon is used most efficiently; therefore usual granular activated carbon can produce a similar effect. The granular activated carbon (special activated carbon for recovering liquid)

is washed with a dilute alkali solution so as to eliminate the adsorbed substance; therefore, the activated carbon may be repeatedly and economically used. Of course, when bacteria and disease germs are adsorbed again, due to the separation of the water cultivation vessel and the activated carbon column this method is more effectively operated than the activated carbon directly. Further, when a small amount of agricultural chemicals are added, the sterilizing action can be effected within the activated carbon layer, resulting in a more complete performance.

According to above methods (activated carbon adding method & clarifying method with activated carbon layer), the invention is not restricted to utilization in vegetables as shown in the examples, but the invention can be used in cultivation of all plants, such as European vegetables, fruits, flowers and the like which can be cultivated in gardening facilities using a vinyl greenhouse etc.

However, the above described method and facilities are insufficient for vegetables such as horseradishes which grow in specific natural environmental conditions. Therefore, consideration must be given with respect to water quality, atmospheric temperature, lighting etc.

Horseradishes are cultivated at pebbly locations of clear flow in deep mountains. The cultivation conditions for horseradishes are as follows:

1. The cultivation is effected in a deep ravine.
2. Trees grow thick and the sun does not shine directly in the summer.
3. Surrounding forest is deep.
4. Base rock is andesite or basalt.
5. Water temperature is constant (12° C – 15° C) throughout the year.
6. Water quality is good.
7. Amount of dissolved oxygen (DO) in the water is large.
8. Water is abundant and clear.

The above conditions can be realized artificially for the most part by using water cultivation with greenhouse facilities but the problem is in maintenance of the water quality. As above described, an organic substance in the water is harmful for the growth of vegetables. A horseradish is particularly sensitive with respect to this and a little dirtiness generates illness and obstructs the growth of horseradish.

The above described water cultivation method and installation of apparatus, which can maintain the specific environmental conditions adaptive for horseradishes, enable water cultivation within a greenhouse for vegetables, such as horseradishes, which are remarkably sensitive to environmental conditions.

EXAMPLE 7

Cultivation experiment of horseradishes.

Figure 2:
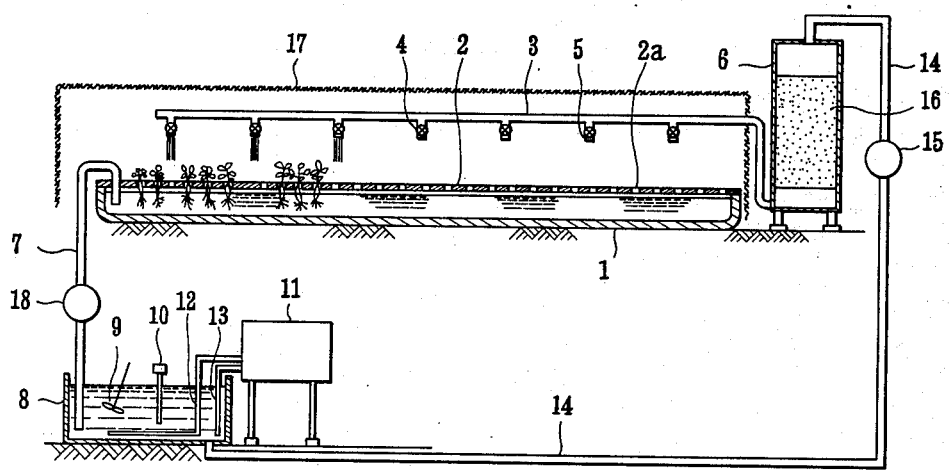
FIG. 2 is a view of an apparatus as another embodiment suitable for water cultivation of specific vegetables such as horseradishes which grow up only at specific environmental conditions.

FIG. 2 shows the apparatus particularly suitable for the water cultivation of horseradishes. On an upper surface of a water cultivation vessel 1 with suitable depth is installed a water cultivation panel 2 as a block unit of suitable area. Above the water cultivation panel 2 is installed a clarified cool water sending pipe 3 extended from bottom of a column 6. On said clarified cool water sending pipe 3 are distributed a suitable number of sprinkling pipes 5 provided with valves 4. The clarified cool nourishing water is sprinkled on horseradish seedlings planted on the water cultivation panel 2 in order to equalize the temperature within the greenhouse with that of deep mountains, dissolve oxygen of the air fully in the nourishing water, and maintain the cultivation circumstance of horseradishes at a constant temperature.

At an inner portion of one end of the water cultivation vessel 1 is extended one end of a drain pipe 7 and through a pump 18 at the intermittent portion the other end of the pipe 7 is inserted in a cooling water vessel 8. Within the cooling water vessel 8 are extended a cool water exhaust pipe 12 and a cool water introducing pipe 13 for a water cooler 11. A stirrer 9 stirs the exhausted nourishing water and the cooled nourishing water, and a thermostat 10 maintains the water temperature at 12° – 15° C suitable for growth of horseradishes.

A cooling water sending pipe 14, one end of which is connected with the cooling water vessel 8 passes through a pump 15 at the intermittent portion and connected to upper portion of the activated carbon column 6. The cooled exhaust nourishing water passes through an activated carbon layer 16 so as to adsorb and eliminate harmful substances, and the clarified cool nourishing water is sprinkled from the sprinkling pipes 5, thus into the water cultivation vessel 1 the clarified water steadily flows.

The water cultivation vessel 1 is provided at upper and surrounding portion with a sun-blind 17 like a curtain made of a well-ventilated material, for example, a cheese cloth, so that soft indirect light passing through the sun-blind is applied to horseradishes planted on the panel 2 for producing the atmosphere like a shade in wood.

A horseradish is a perennial plant and the growth stops in the summer and the winter. This cannot stand because a horseradish is extremes of temperature. For example, in the Izu region in Shizuoka Prefecture in Japan a horseradish can grow even in the winter, on account of the mild climate, and the growth is promoted.

Figure 3:
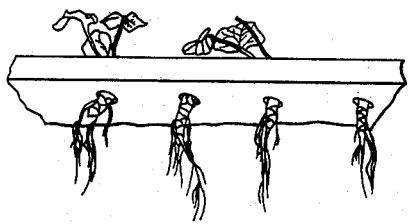
FIG. 3 is a view showing a growth state of roots of horseradishes.

According to the water cultivation facilities in the present invention, the following effects are produced:

1. Water cultivation of horseradishes in greenhouse facilities is possible, and the growth throughout the year is enabled by controlling the temperature steadily.
2. Therefore, growth for 40 days from planting according to the present invention is equivalent with that for 6 months in actual cultivation region (FIG. 3).
3. Fertilization in the cultivation of horseradishes is sometimes effected in mountain regions, however, the fertilizer is applied to the flowing water; therefore the efficiency is quite bad and the fertilization is disadvantageous from an economical view. In the water cultivation method, the fertilizer is added in the nourishing water and circulated, resulting in no loss of the fertilizer. The most advantageous point is that sufficient fertilizer is supplied in the water cultivation method while the amount of the nourishment is quite small in natural flowing water.

The sufficient fertilization together with the temperature condition can promote the growth of horseradish remarkably. Although in general the harvest period of the horseradish is 1 – 2 years, harvest of two times per year is possible according to the present invention.

Further, since the fertilization is effected artificially, condensed planting is possible at 2 – 3 times in comparison to natural cultivation in a mountain region. In addition, since horseradish prefers semi-sunshade to direct sunshine, increased harvest is possible by using multi-staged vessels.

Of course, the apparatus shown can be used for the usual vegetables and flowers as well as horseradishes.

We claim:

1. In a method of cultivating plants hydroponically wherein said plants are supported so that the roots of said plants are maintained in an aqueous nutrient solution and the tops of said plants are maintained above said solution whereby said plants are grown by means of water containing nutrients, substantially in the absence of soil, the improvement comprising adding activated carbon to said water, whereby organic substances harmful to said plants are adsorbed by said carbon and the growth and quality of said plants are improved.

2. Method according to claim 1 wherein the nourishing water includes powdered activated carbon in an amount of about 0.1–0.4% in relation to the nourishing water weight.

3. In a method of cultivating plants hydroponically wherein said plants are supported so that the roots of said plants are maintained in an aqueous nutrient solution and the tops of said plants are maintained above said solution to whereby said plants are grown by means of water containing nutrients, substantially in the absence of soil, the improvement comprising circulating the aqueous nutrient solution used for said plants through a layer of granular activated carbon contained in a vessel separate from the vessel in which the plants are grown in order to clarify said water and remove organic substances harmful to said plants and the growth and quality of said plants are thereby improved.

4. Method according to claim 3 wherein said circulating nutrient solution is maintained at suitable water temperature and water quality adapted for specific vegetables which grow normally only at a specific natural environment, and wherein atmospheric conditions including the light are adapted for said specific vegetables.

5. Method according to claim 3 wherein said water is continuously circulated through said granular activated carbon.

* * * * *